United States Patent [19]

Utz

[11] 3,949,042
[45] Apr. 6, 1976

[54] METHOD AND APPARATUS FOR MAKING LAMINAR PLASTIC SHEET MATERIAL

[75] Inventor: Kastulus Utz, Freising, Germany

[73] Assignee: Multifol Patentverwertungs AG, Chur, Switzerland

[22] Filed: Mar. 20, 1974

[21] Appl. No.: 452,849

Related U.S. Application Data

[63] Continuation-in-part of Ser. No. 254,971, May 19, 1972, abandoned, which is a continuation of Ser. No. 35,841, May 8, 1970.

[30] Foreign Application Priority Data

May 9, 1969 Germany............................ 1923852

[52] U.S. Cl. ................. 264/173; 156/79; 156/229; 156/244; 264/95; 264/209; 264/210 R; 264/237
[51] Int. Cl.² ...................... B29D 7/24; B32B 27/34
[58] Field of Search.......... 264/173, 95, 209, 210 R, 264/237, 290 R; 156/79, 229, 244; 425/131, 133

[56] References Cited
UNITED STATES PATENTS

| | | | |
|---|---|---|---|
| 2,317,687 | 4/1943 | Larchar | 264/209 |
| 3,068,516 | 12/1962 | Hofer | 264/95 |
| 3,187,982 | 6/1965 | Underwood et al. | 264/95 |
| 3,239,588 | 3/1966 | Berggren et al. | 264/209 |
| 3,397,101 | 8/1968 | Rausing | 156/229 |
| 3,508,944 | 4/1970 | Henderson et al. | 264/95 |
| 3,567,539 | 3/1971 | Schirmer | 156/229 |

*Primary Examiner*—Jeffery R. Thurlow
*Attorney, Agent, or Firm*—Hans Berman

[57] ABSTRACT

A tubular, laminar, plastic sheet material having a core layer of oriented plastic and two outer layers of approximately isotropic plastic is prepared in extrusion apparatus whose die block has three channels wider than they are thick, and merging at acute angles to form an extrusion nozzle. The channels are continuously supplied with molten resin compositions webs of which are superimposed on each other in area contact at the junction of the channels. They move as an initially fluid, but coherent, layered structure from the nozzle into an immediately adjacent duct of a cooling head in which the structure is cooled from a first temperature above the melting temperature of the highest-melting resin composition of the central layer to a temperature intermediate that melting temperature and the temperature at which the outer, lower melting layers become solid. The friction exerted on the fluid outer layers by the walls of the duct in the cooling head exerts a sufficient braking action on all three layers that the laminar structure may be drawn from the outer orifice of the cooling head under tension high enough to stretch the laminar structure to twice its initial length or more without failure in tension of the plastic material in the cooling head and the die nozzle. Only the central layer is solid at the outer orifice of the cooling head so as to become oriented while the still fluid outer layers remain isotropic.

5 Claims, 3 Drawing Figures

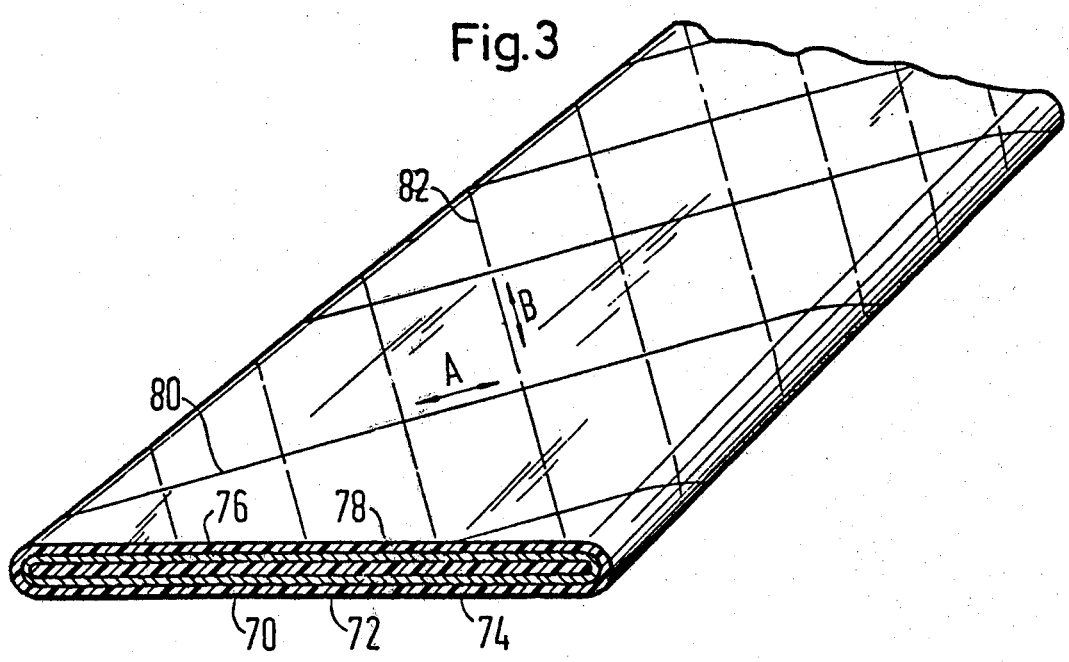

METHOD AND APPARATUS FOR MAKING LAMINAR PLASTIC SHEET MATERIAL

This application is a continuation-in-part of the co-pending application Ser. No. 254,971, filed May 19, 1972, now abandoned, and itself a continuation of the abandoned application Ser. No. 35,841, filed on May 8, 1970.

This invention relates to laminar plastic sheet material having a stretched and thereby oriented inner layer and two surface layers which lack significant orientation. More particularly, the invention relates to a method of making such sheet material and to apparatus for performing the method.

Laminar sheet material of the type referred to above has been produced heretofore (see German Pat. No. 1,161,679) and has many known applications in packaging where the improved strength of the stretched layer is to be combined with desirable chemical or physical properties of the outer layers. However, a method of producing the partly stretched plastic sheet material at low cost on an industrial scale, and apparatus for performing the method, were not available heretofore. This invention aims at supplying the lacking apparatus and method.

It has been found that laminar plastic sheet having a stretched core layer and unstretched outer layers can be prepared on simple equipment at low cost and at high production rates by continuously and simultaneously moving first, second, and third elongated webs of respective first, second, and third synthetic resin compositions in the direction of their elongation to a first zone, and thence through a second zone to a third zone. Each web has two opposite longitudinal faces, and the second composition has a higher melting temperature than the melting temperatures of the first and third compositions. Respective longitudinal faces of the first and third webs are superimposed on the longitudinal faces of the second web in the first zone under a pressure sufficient to combine the webs into a coherent layered structure at a temperature of the first zone which is higher than the melting temperature of the second composition.

After the structure has been moved from the first zone to the second zone at a first linear speed, it is cooled during movement through the second zone from the first temperature to a second temperature lower than the melting temperature of the second composition, but higher than the melting temperatures of the first and third compositions. The rate of movement of the structure through the second zone must be slow enough to cause significant solidification of the second composition in the second zone. Frictional braking force is applied to the exposed first and third webs in the second zone and is transmitted therefrom to the second web in the second zone. In the third zone, the structure is cooled below the melting temperature of the first and third composition. longitudinal tension is applied to the structure in the third zone at a rate sufficient to move the same from the second into the third zone at a second speed substantially greater than the afore-mentioned first speed. The braking force applied in the second zone must be sufficient to prevent failure of the second web in the second zone under the tension applied in the third zone, but it must permit stretching of the second web during movement thereof from the second to the third zone under the applied tension.

The apparatus employed for performing the method includes a die block formed with a plurality of channels, substantially wider than thick, which merge at acute angles to form an extrusion nozzle. Molten resin composition is supplied to each channel for flow from the channels into the nozzle. A cooling head contiguously secured to the die block is formed with a duct aligned with the afore-mentioned nozzle for receiving flowing resin composition from an orifice of the nozzle, the nozzle and duct being each substantially wider than thick transverse to the direction of composition flow. Means are provided for cooling resin composition flow in the duct, and for drawing cooled resin composition from an orifice of the duct remote from the orifice of the nozzle.

Other features, additional objects, and many of the attendant advantages of this invention will readily be appreciated as the same becomes better understood by reference to the following description of preferred embodiments when considered in connection with the appended drawing in which:

FIG. 3 is a perspective view of a flat laminar foil, partly in cross section, prepared on the apparatus of FIG. 2.

Figure 1:
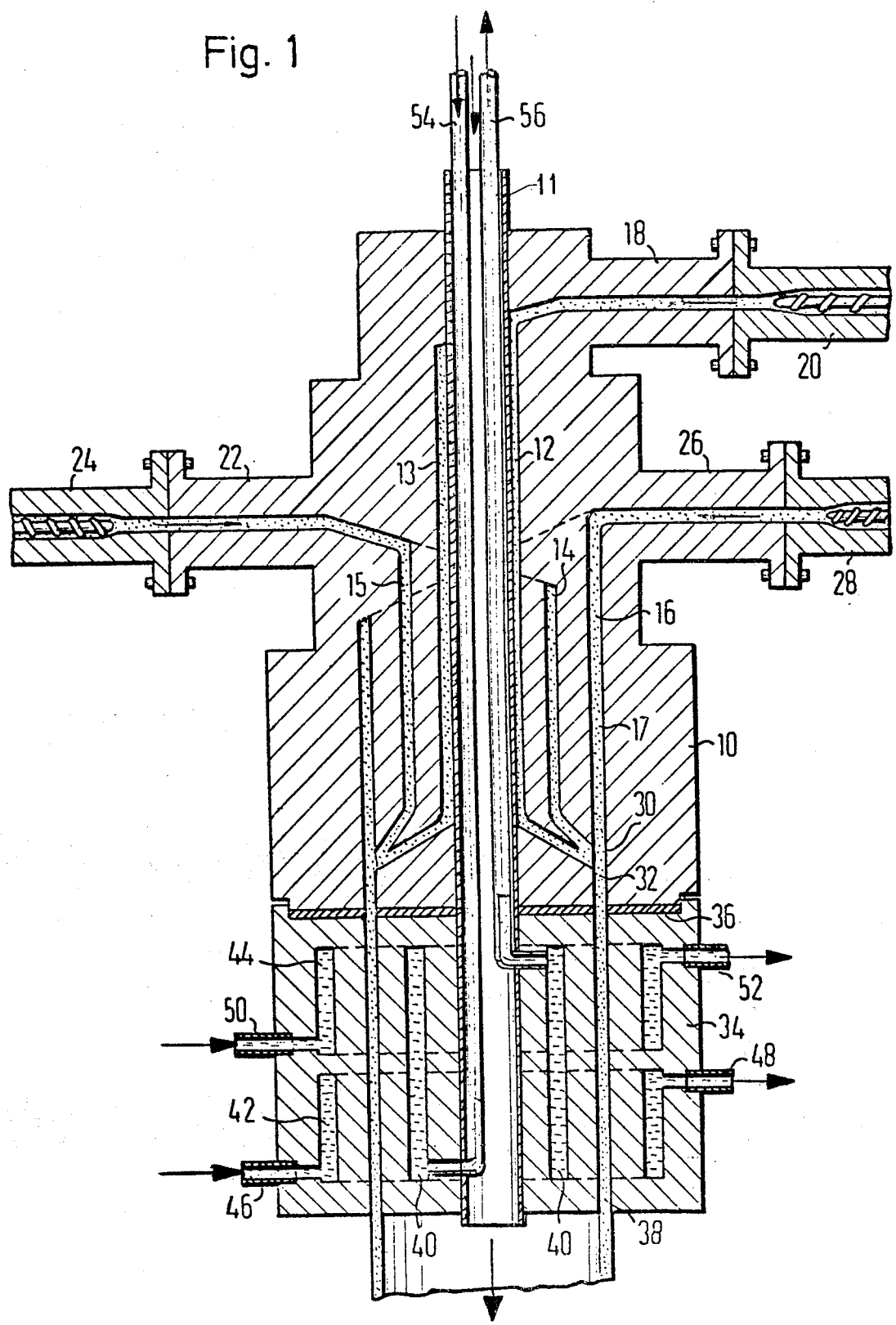
FIG. 1 shows a portion of a triple-screw extruder according to the invention in elevational section and in inverted (upside down) position.

Referring initially to FIG. 1, there is shown a die block or die 10 of circular cross section formed with an axial bore. The die is assembled from a plurality of parts in a conventional manner, not shown, which form three channels 13, 15, 17 having respective cylindrical, coaxial portions. Die adapters 18, 22, 26 connect the channels to respective screw extruders 20, 24, 28, only partly shown and not to scale.

A melt of synthetic resin supplied from the extruder 20 is shaped into a tubular web 12 in the radially innermost channels 13, the thickness of the web transverse to the direction of movement being much smaller than its width. Webs 14, 16 of molten resin are similarly formed in the intermediate channel 15 and the radially outer channel 17. The channels merge obliquely at acute angles near and at an annular junction 30 so that the molten webs 12, 16 are superimposed on the radially inner and the radially outer longitudinal face of the web 14. At the temperature maintained at the junction 30 by heaters conventional and not illustrated, and at the prevailing transverse pressure, the three webs form a coherent, laminar, fluid structure which is discharged from the die 10 through a cylindrical extrusion nozzle 32.

A cooling head 34 of circular cross section is fastened coaxially to the die 10 in a manner known in itself and not shown. A layer 36 of insulating material minimizes heat transfer between the die 10 and the coaxial cooling head 34. An annular duct 38 is cylindrical about the common axis of the die 10 and head 34, equal in diameter to the nozzle 32 and axially aligned with the nozzle. The adjacent orifices of the duct 38 and the nozzle 32 are sealed to each other and of substantially identical width and thickness transverse to the direction of plastic flow. An axial bore through the cooling head and the aligned bore in the die 10 are provided with a common tubular liner 11 of insulating material.

A generally cylindrical coolant duct 40 is formed in the central or mandrel portion of the head 34 between the liner 11 and the duct 38, and two axially spaced, axially aligned cylindrical ducts 42, 44 are formed in the sleeve portion of the cooling head radially outside the duct 38. Cooling fluid is supplied to the duct 42 through a radial nipple 46, and discharged through a nipple 48. Nipples 50, 52 communicate with the duct 44 for the same purpose. The duct 40 is connected with two pipes 54, 56 passing from the cooling head 34 through the die 10 in the liner 11 for coolant flow through the duct 40.

Figure 2:
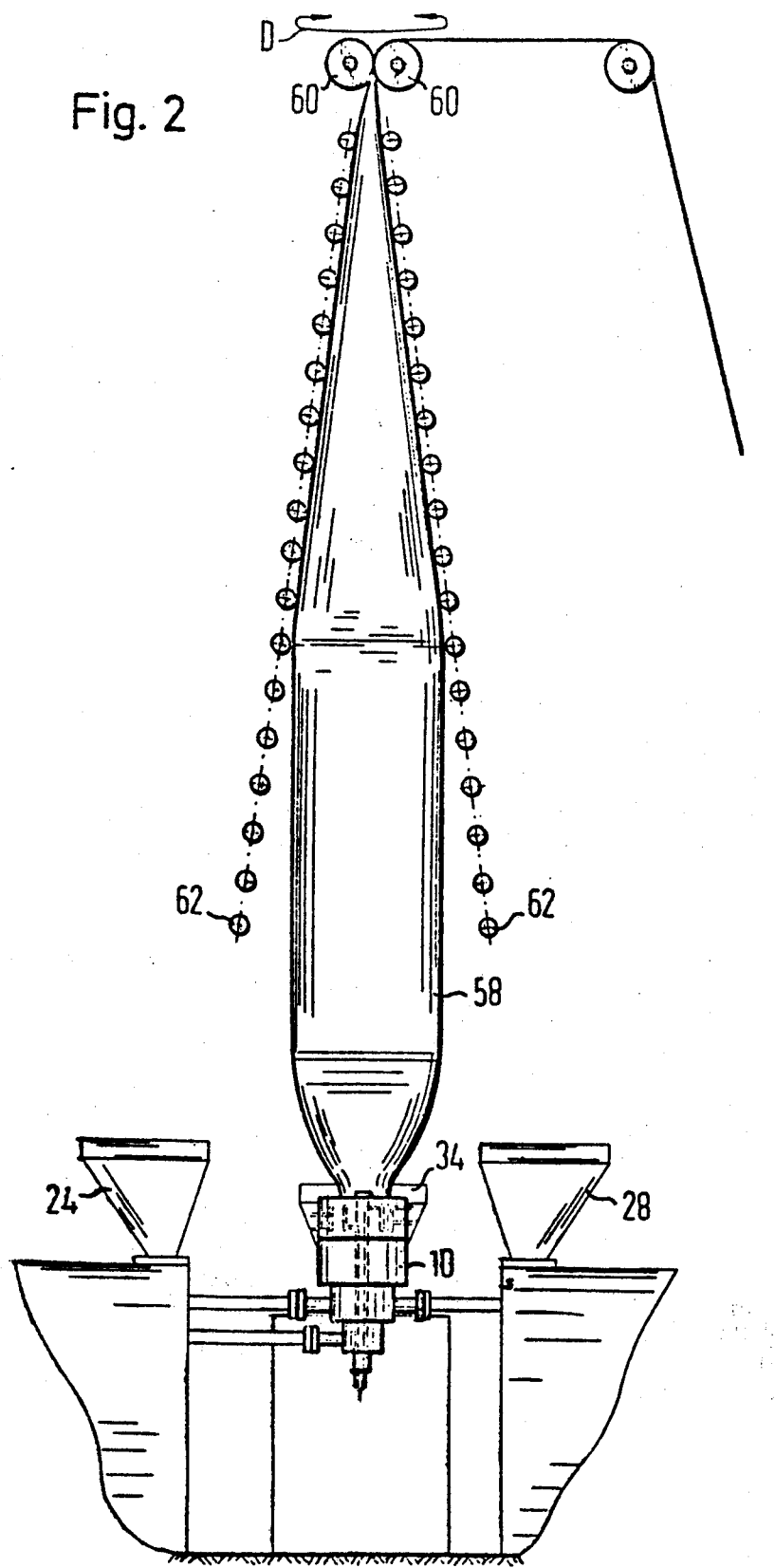
FIG. 2 shows the apparatus of FIG. 1 and associated devices in elevation on a smaller scale.

As is shown in FIG. 2, the laminar plastic tube 58 formed in the die 10 and partly solidified in the head 34 is discharged from the latter and expanded by a gas supplied through the liner 11 in a known manner, not shown in detail, and is drawn off axially from the outer orifice of the duct 38 by a pair of driven, overhead, take-off or pinch rolls 60 mounted on a common support, not shown, which may be turned or oscillated about a vertical axis is indicated by the arrow D. Two tracks of guide rolls 62 converge from the cooling head 34 toward the nip between the take-off rolls 60 in which the initially cylindrical tube 58 is flattened.

A flat sheet which may be discharged continuously during operation of the apparatus of FIGS. 1 and 2 is shown in FIG. 3.

It has two face layers 70, 78 integrally joined along the narrow sheet edges, two similarly joined intermediate layers 72, 76, and an innermost layer 74 somewhat thicker than the other layers. As will be explained in more detail hereinbelow, the intermediate layers 72, 78 are stretched monoaxially at right angles to each other as indicated by arrows A, B and lines 80, 82.

The operation of the apparatus described above will be further illustrated by the following Examples.

EXAMPLE 1

A copolymer of ethylene with approximately 5% vinyl acetate having a specific gravity of 0.93 and a melt index of 3 was supplied continuously to the channels 13 and 17 from the screw extruders 20, 28 at a temperature of 160°C. The melt index, as referred to in these Examples, is determined at the conventional temperature of 190°C, but at an extruding force of 2000 grams, as is continental European practice.

The extruder 24 supplied the die 10 with a low-pressure polyethylene having a melt index of 0.5 and a specific gravity of 0.96 at 160°C. The temperature of the die 10 was held by nonillustrated, built-in electric heaters at 230° – 240°C, the cooling fluid supplied to the duct 40 has a temperature of about 115°C while the cooling fluids for the ducts 44, 42 had respective temperatures of 180° and 160°C.

The three fluid, viscous, tubular webs 12, 14, 16, superimposed on each other above the melting temperature of the low-pressure polyethylene, were joined at the junction 30 in a laminar structure having some coherence due to the transverse pressure prevailing in the extrusion nozzle 32, and also heatsealed to each other. The bond strength was sufficient to practically completely prevent relative longitudinal movement of the webs in the nozzle 32 and thereafter in the duct 38 of the cooling head 34.

The laminar, tubular structure 58 discharged from the cooling head 34 had a temperatue about 5° to 7°C below the melting temperature of the low-pressure polyethylene and about 15°C above the melting temperature of the copolymer. The tube was drawn from the cooling head by the rolls 60 at a linear speed four times the speed at which the composite melt entered the cooling zone of the head 34 from the shaping zone in the die 10, thereby stretching the tube 58 longitudinally while it moved from the cooling zone in the head 34 into a third zone extending from the head 34 in the direction of movement of the tube 58.

The applied tension and resulting stretching caused molecular orientation in the almost completely solidified central polyethylene layer in the longitudinal direction while the still fluid outer layers of copolymer were reduced in thickness without molecular orientation.

Failure of the composite structure within the die 10 and the head 34 under the applied tension was prevented by the braking force applied to the copolymer layers which were frictionally engaged by the walls of the cooling head 34 under high contact pressure, and transmitted the braking force to the intermediate polyethylene layer.

The common support of the roll 60 was oscillated about its vertical axis so as to impart to the rolls an alternating angular velocity in the plane through their nip about equal to the velocity of their rotation about their axes which determines the draw-off speed of the tube 56. The distance between the cooling head 34 and the rolls 60 and the ambient temperature were chosen such that the copolymer layer originating in the web 12 still had a temperature of about 105° to 110°C when the tube 58 was flattened under pressure in the nip of the rolls 60. The two superimposed thicknesses of the web 12 were thereby welded to each other to form the innermost or core layer 74 of the resulting product illustrated in FIG. 3.

The direction of originally longitudinal stretching and orientation of the resin composition in the web 14 was tilted into sections of a helix having alternating positive and negative pitch angles of 45°. In the flattened tube section shown in FIG. 3, the plastic of the two intermediate layers 72, 76 thus has directions of orientation A, B which are approximately at right angles to each other.

The flat, continuous sheet discharged from the rolls 60 was further cooled for complete solidification of the copolymer layers and then cut to lengths or reeled, as is conventional and not shown.

EXAMPLE 2

In a procedure analogous or identical with that described in Example 1, as far as not stated otherwise, polyethylene having a melt index of 5 to 6 and a specific gravity of 0.920 to 0.922 was fed to the die 10 by the extruders 20, 28 at 240°C, while nylon 6 (poly-ϵ-caprolactam; Ultramid B 4 or Durethan BK 40 F) was supplied by the extruder 24 to the die 10 which was hels at 230° to 240°C.

The laminar structure shaped in the die 10 was discharged from the cooling head 34 at 180° to 190°C, a temperature approximately 20° to 30°C below the melting temperature of the polyamide and approximately 60° to 70°C above the melting temperature of the polyethylene employed.

The composite structure whose layers cohered within the die 10 and the cooling head 34 mainly under transverse pressure was stretched at the discharge end of the duct 38 where the nylon layer was stretched and molecularly oriented. Failure of the melt within the cooling head 34 and the die 10 under the strong tension applied by the rolls 60 was prevented by the friction exerted by the walls of the cooling head 34 on the adjacent layers of fluid, but viscous polyethylene in the duct 38.

The rolls 60 did not rotate about the vertical axis of their common support during draw-off, and the continuous flat sheet obtained after complete cooling and solidification of the polyethylene layers differed from the product shown in FIG. 3 by intermediate layers oriented in a common longitudinal direction, the solidified outer and innermost layers being isotropic.

EXAMPLE 3

The procedure of Example 2 was repeated, but the polyethylene was fed to the die 10 at 200°C while the extruder 24 supplied polypropylene having a melt index of 0.2 and a specific gravity of 0.896 at the same temperature (Novolen KR 1300 G). The cooling fluids in the ducts 40, 44, 42 had respective temperatures of 110°, 150°, and 140°C.

A laminar sheet having layers of polyethylene sealed to a layer of longitudinally stretched and oriented polypropylene was obtained in a manner evident from Example 2.

EXAMPLE 4

The die 10 was supplied from the extruders 20, 28 at 220° to 230°C with a ternary copolymer of ethylene, acrylic acid, and acrylic ester having a melt index of 6 to 8 and a specific gravity of 0.926 (Lupolen KR 1285, a product of BASF, Ludwigshafen, Germany). The extruder 24 furnished a continuous melt of nylon 6 of the same type as described in Example 2. The shaping and cooling temperatures were as in Example 2, and the laminar, welded structure discharged from the cooling head 34 had a temperature of 180° to 190°C which was about 20° to 30°C below the melting temperature of the polyamide and about 80° to 90°C above the melting temperature of the copolymer.

The discharged tube 58 was inflated by gas introduced through the liner 11 at a gage pressure of about 1 kp/cm$^2$, whereby the tube was stretched transversely at an approximate ratio of 1:2.5, causing orientation in the nylon layer without affecting the copolymer layers beyond a reduction in thickness, and a longitudinal stretching at about the same ratio was achieved by an appropriate rotary speed of the rolls 60. The flat sheet discharged from the rolls 60 and cooled had biaxially oriented intermediate layers 72, 76.

No inflation was used in Example 1 to 3.

The method of the invention, as illustrated by the preceding Examples, may employ resin compositions capable of firmly sealing to each other under the conditions of temperature and pressure prevailing at the junction 30, but such heat sealability is not required and the lack of strong bonds between the several layers of the laminar product is acceptable in many applications.

It is essential that the melting temperature of the resin composition fed to the die channel 15 be higher than that of the materials supplied to the channels 13 and 17, but the necessary magnitude of this difference depends on the available temperature controls of the apparatus, on the constant mass flow velocity of the plastic through the apparatus, on dimensional factors, on the width of the melting range of the individual resin compositions, and on other operating variables, as will be readily apparent to those skilled in the art.

Among the resin composition not specifically referred to in the Examples, but employed successfully as lower-melting components of laminar sheet material according to the invention including a stretched nylon layer are ionomer resins, such as Surlyn A (Dupont de Nemours). Other resin combinations will readily suggest themselves to those skilled in the art.

The use of two independent cooling ducts 44, 42 spacedly juxtaposed in the direction of resin flow through the cooling head 34 facilitates precise temperature control in the flowing resin, and thus permits selective orientation of a layer of resin compositions whose melting temperature is closely adjacent the melting temperature of the resin in another layer which remains isotropic.

If so desired, and without changes in the apparatus or in the manipulative steps employed, the inner and outer layers of relatively low-melting resin composition may be entirely different in their composition as long as they both melt below the melting temperature of the interposed resin composition.

The lower-melting resin composition layers which form the exposed faces of the tubular structure shaped in the die 10 protect the solidifying central layer from contact with the walls of the cooling head 34, thereby preventing blocking of the duct 38 by solidified resin. The layers remaining fluid during movement through the entire cooling head function as parting compounds for the solidifying resin composition of the central layer. While they facilitate the movement of the higher-melting web through the cooling head in the manner of a lubricant, their effect has nothing to do with the respective coefficients of friction between the walls of the duct 38 and the resin compositions moving therein.

It should be understood, of course, that the foregoing disclosure relates only to preferred embodiments of the invention, and that it is intended to cover all changes and modifications of the examples of the invention herein chosen for the purpose of the disclosure which do not depart from the spirit and scope of this invention set forth in the appended claims.

What is claimed is:

1. A method of preparing a laminar plastic material which comprises:
  a. continuously and simultaneously moving a first elongated web of a first synthetic resin composition, a second elongated web of a second synthetic resin composition, and a third elongated web of a third synthetic resin composition in the direction of elongation thereof to a first zone and thence through a second zone to a third zone,
     1. each web having two opposite longitudinal faces,
     2. said second composition having a higher melting temperature than the melting temperatures of said first and third compositions,
     3. said second composition being capable of being oriented when said second web is stretched longitudinally while in the solid state;
  b. superimposing respective longitudinal faces of said first and third webs in said first zone on the longitudinal faces of said second web under a pressure sufficient to combine said webs into a coherent layered structure,
     1. said first zone being at a first temperature higher than the melting temperature of said second composition,
     2. said structure being moved from said first zone to said second zone at a first linear speed, and being confined in each of said first and second zones under said sufficient pressure;

c. cooling said structure during movement through said second zone from said first temperature to a second temperature lower than the melting temperature of said second composition, but higher than the melting temperatures of said first and third compositions,
   1. the rate of movement of said structure through said second zone being slow enough to cause solidification of said second composition in said second zone;

d. applying frictional braking force to said first and third webs in said second zone and transmitting said braking force from said first and third webs to said second web in said second zone;

e. cooling said structure in said third zone below the melting temperature of said first and third compositions;

f. applying longitudinal tension to said cooled structure in said third zone at a rate sufficient to move said structure from said second into said third zone at a second speed substantially greater than said first speed,
   1. said braking force being sufficient to prevent failure of said second web in said second zone under the tension applied in said third zone, while permitting stretching of said structure during movement thereof from said second to said third zone under said applied tension, thereby orienting said second composition.

2. A method as set forth in claim 1, wherein said first and third compositions are substantially identical.

3. A method as set forth in claim 1, wherein said webs are tubular.

4. A method as set forth in claim 3, wherein said second composition essentially consists of polyamide and said first and third compositions essentially consist of olefin polymers.

5. A method as set forth in claim 1, wherein said pressure is maintained during said applying of longitudinal tension.

* * * * *